L. M. BOWMAN.
DIRECTION INDICATOR FOR MOTOR VEHICLES.
APPLICATION FILED APR. 20, 1917. RENEWED AUG. 1, 1918.

1,302,296.

Patented Apr. 29, 1919.
2 SHEETS—SHEET 1.

Witnesses
C. A. Beale
W. F. Davidson

Inventor
L. M. Bowman
By
Attorney

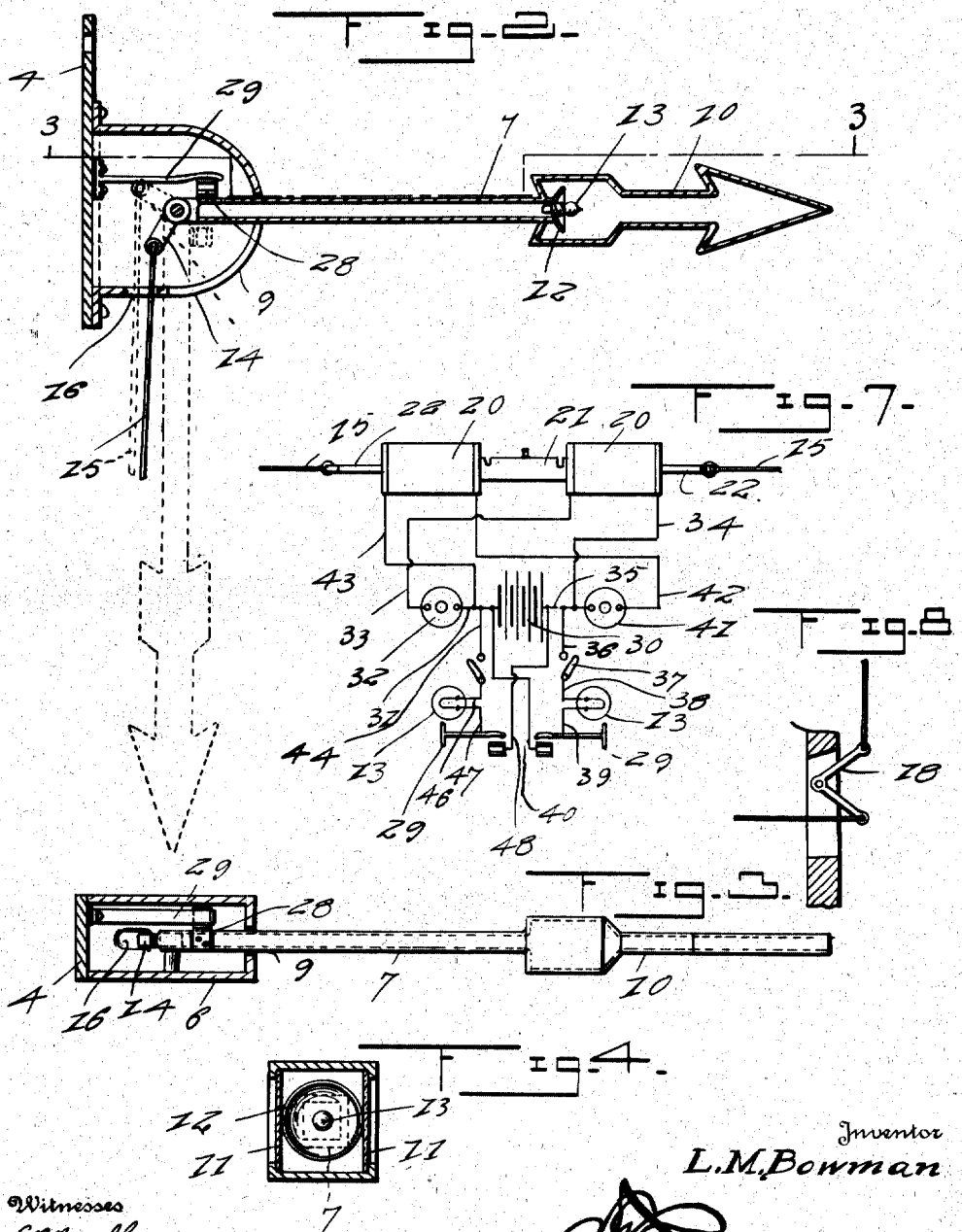

UNITED STATES PATENT OFFICE.

LEVI M. BOWMAN, OF TULSA, OKLAHOMA, ASSIGNOR OF ONE-HALF TO WILLIAM A. SMITH, OF TULSA, OKLAHOMA.

DIRECTION-INDICATOR FOR MOTOR-VEHICLES.

1,302,296.

Specification of Letters Patent.

Patented Apr. 29, 1919.

Application filed April 20, 1917, Serial No. 163,468. Renewed August 1, 1918. Serial No. 247,872.

*To all whom it may concern:*

Be it known that I, LEVI M. BOWMAN, a citizen of the United States, residing at Tulsa, in the county of Tulsa and State of Oklahoma, have invented certain new and useful Improvements in Direction-Indicators for Motor-Vehicles; and I do hereby declare the following to be a full, clear, and exact description of the invention, such as will enable others skilled in the art to which it appertains to make and use the same.

This invention relates to direction indicators for motor vehicles and has for one of its objects the provision of a device of this character, whereby the operator of the automobile or motor vehicle may readily notify traffic in the front and rear in which direction a turn is contemplated, thus obviating numerous accidents caused by approaching vehicles not being aware of the procedure of the respective automobile or motor vehicle.

Another object of this invention is the provision of direction indicating arms pivotally secured upon each side of the automobile and are adapted to be swung into horizontal or signaling position to indicate in which direction the automobile or motor vehicle is going to turn.

A further object of this invention is the provision of means for illuminating the signaling arms when they move to signaling position so as to make them visible at night time.

A still further object of this invention is the provision of novel electrical means for moving the direction indicating arms into signaling or horizontal position and which will maintain this position until manually released.

A still further object of this invention is the provision of a direction indicator of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1:
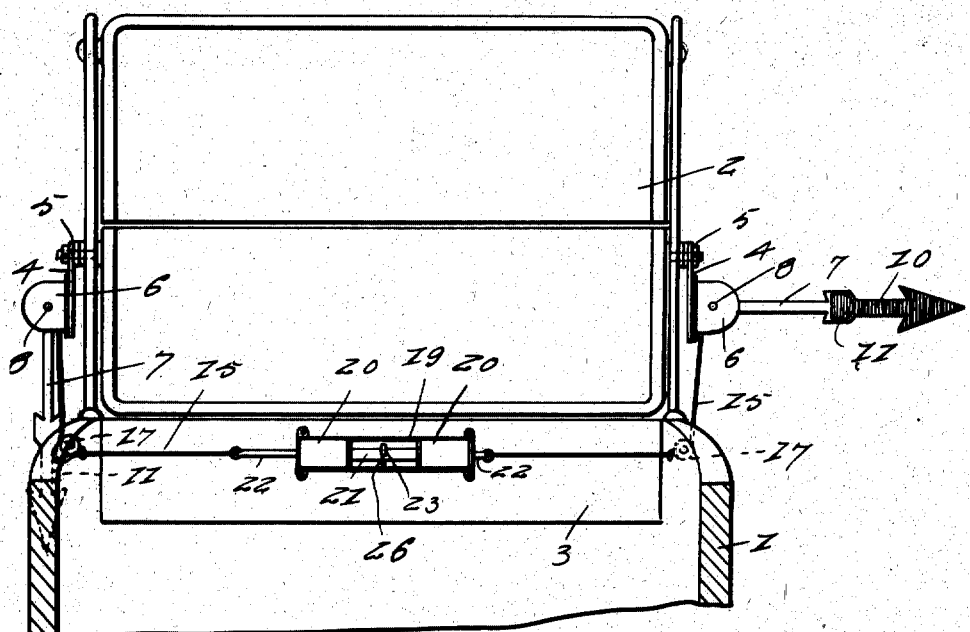
Figure 5:
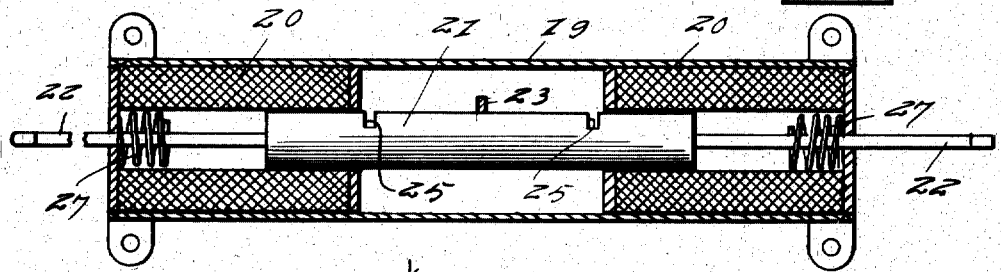
Figure 6:
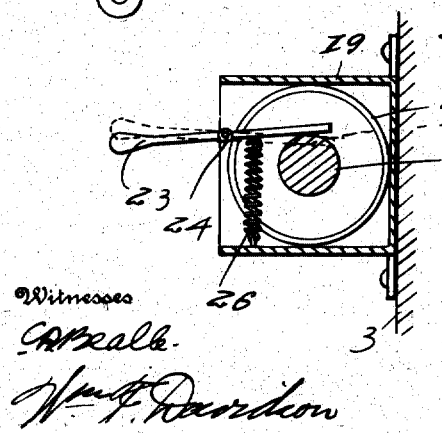

Figure 1 is a fragmentary rear elevation partly in section of an automobile illustrating my invention applied thereto, Fig. 2 is a vertical sectional view illustrating in dotted lines the normal position of the indicating arms, Fig. 3 is a longitudinal sectional view taken on the line 3—3 of Fig. 2, Fig. 4 is a transverse sectional view taken through the indicating arms, Fig. 5 is a longitudinal sectional view of the electrical means for swinging the signaling arms into signaling position, Fig. 6 is a transverse sectional view illustrating the means for locking the direction indicating arms into signaling position, Fig. 7 is a diagrammatical view of the wiring diagram for my invention, Fig. 8 is a detail view illustrating a bell crank lever to be used in connection with my invention.

Referring in detail to the drawings, the numeral 1 indicates the body of an automobile having the usual wind shield 2 mounted thereon. The body 1 is provided with a dash 3 for the purpose of supporting a portion of my invention so that the same will be in convenient reach of the operator. The foregoing description relates to a well known construction of automobiles and to which my invention is applied.

Brackets 4 are secured upon each side of the wind shield as illustrated at 5 and have secured thereto, casings 6. The casings 6 have pivotally mounted therein, direction indicating arms 7, as shown at 8 and which are of hollow formation. The signaling arms 7 extend through an elongated slot 9 in the casings and have their free ends enlarged in the formation of an arrow 10. The arrows 10 are constructed from a frame, which have their side faces closed by glass plates 11, which may be of any desired color suitable for the purpose. Located within the arrows are reflectors in which are mounted, electric lamps 13 for the purpose of illuminating the arrows and direction indicating arms at night time so as to make the direction indicating arms visible at all times.

Operating arms 14 are formed on the pivoted ends of the direction indicating arms 7 and have connected thereto, flexible cables 15, which extend through slots or openings 16 in the casing. The flexible cables 15 extend downwardly from the casings 6 and pass over pulleys 17 over the front of the dash 3 as clearly shown in Fig. 1. If desired, the pulleys 17 may be replaced by bell crank levers 18, as shown in Fig. 8.

A suitable casing 19 is secured to the dash 3 in any well known manner and has mounted in each end, solenoids 20. Slidably mounted within the solenoids 20 is a core 21 having formed upon each end, rods 22, which extend through the ends of the casings and connected to the free ends of the flexible cables 15. A lever 23 is pivoted to the casings as shown at 24 and is adapted to engage either of the notches 25 formed within the core 21 under the influence of the spring 26 for locking the core in either of the solenoids after being drawn therein. The solenoids 20 are connected to an electrical source, which will be hereinafter more fully described, whereby upon energizing one of the solenoids, the core 21 will be drawn therein, moving one of the direction indicating arms into signaling or horizontal position. As the core 21 moves within the above referred to solenoid when energized, the lever 23 drops within one of the notches 25 under the tension of the spring 26 and holds the core against returning to its normal position, thereby supporting the direction indicating arm in signaling position, thus it will be noted that it is only necessary to energize the solenoids by an electrical current to draw the core 21 therein whence it will become locked against movement supporting the direction indicating arm in signaling position.

When it is desired to move the other direction indicating arm into signaling position, the other solenoid is energized attracting the core 21 therein, and upon movement of the core 21 in said solenoid, it will become locked therein, owing to the fact that the lever 23 moves into the other notch 25, holding the direction indicating arm in signaling position. When it is desired to permit the direction indicating arms to return to their normal positions as shown in Fig. 2 by dotted lines, the lever 23 is disengaged from the notch 25, whence the direction indicating arms move downwardly by gravity, returning the core 21 to its normal position as shown in Fig. 5.

Located within each of the solenoids 20 are shock absorbing springs 27 to prevent undue rapid movement of the core 21 when reaching its innermost position within the solenoids.

Each of the direction indicating arms adjacent their pivot points are provided with a movable contact 28, which is adapted to engage a stationary contact 29, when the direction indicating arms move into signaling position. The electric lamps 13 being connected to the contacts 29 and 28 by conductors, as illustrated in Fig. 2.

Referring to Fig. 7 in which a diagram of the wiring system of my invention is shown, it consists of a storage battery 30, having connected thereto, a conductor 31, which is in turn connected to a push button 32. The push button 32 is connected to a conductor 33, which connects to the right hand solenoid. A conductor 34 is connected to right hand solenoid and to a conductor 35, which is connected to the storage battery, whereby upon completing an electric circuit through the push button 32, the right hand direction indicating arm will be moved into signaling position. A conductor 36 is connected to the conductors 35 and to a switch 37. The electric lamp 13 located within the right hand direction indicating arm is connected to the switch 37 by a conductor 38. A conductor 39 leads from the right hand electric lamp 13 to the right hand stationary contact 29. A conductor 40 is connected to the right hand movable contact or the contact located on and carried by the right hand direction indicating arm. The conductor 40 is in turn connected to the conductor 31, whereby upon closing the switch 37 and the right hand direction indicating arm moving into signaling position, the electric lamp therein will be illuminated, thus making the arm visible at night time. A push 41 is connected to the conductor 35 and has connected thereto, a conductor 42, which is in turn connected to the left hand solenoid. A conductor 43 is connected to the left hand solenoid and to the conductor 31, whereby upon closing the push button 41, the left hand solenoid will be energized, swinging the left hand direction indicating arm into signaling position. A conductor 44 is connected to the conductor 31 and to a switch 45. The switch 45 is connected to the left hand electric lamp 13 located within the left hand direction indicating arm by a conductor 46. A conductor 47 is connected to the left hand electric lamp 13 and to the left hand stationary contact 29. A conductor 48 is connected to the left hand movable contact 28 and to the conductor 35, whereby upon closing the switch 45 and the left hand direction indicating arm moving into signaling position, the left hand electric lamp 13 will be illuminated. The various push buttons and switches heretofore described may be located upon the dash 3 or any desired point within convenient reach of the operator of the automobile or motor vehicle.

While I have shown and described the preferred embodiment of my invention, it will be understood that minor changes in construction, combination and arrangement of parts may be made without departing from the spirit and scope of the invention as claimed.

Having thus described my invention, I claim:

1. A direction indicator for motor vehicles comprising casings, direction indicating arms pivoted within said casings and normally depending downwardly therefrom, solenoids, a core slidable in said solenoids, means for connecting the core to the direction indicating arms, means for energizing the solenoids to attract the core for moving the direction indicating arms in signaling position, and means for locking the core against movement to hold the direction indicating arms in signaling position.

2. A direction indicator for motor vehicles comprising casings, direction indicating arms pivoted to said casings and normally depending downwardly therefrom, a casing, solenoids mounted within the last named casing, a core slidable in said solenoids, flexible cables connected to each end of the core and to the direction indicating arms, means for energizing the solenoids to attract the core for moving the direction indicating arms into signaling position, and means for locking the core within the solenoids for supporting the direction indicating arms in signaling position.

3. A direction indicator for motor vehicles comprising casings secured upon each side of the vehicle, direction indicating arms pivoted to said casings and normally depending downwardly therefrom, relatively spaced solenoids carried by the motor vehicle, a core slidable in said solenoids and having relatively spaced notches, means for connecting the ends of the core to the direction indicating arms, means for energizing the solenoids for attracting the core to move the direction indicating arms into signaling position, a lever located adjacent the solenoids and adapted to engage either of the notches of the core for locking said core against movement to support the direction indicating arms in signaling position.

4. A direction indicator for motor vehicles comprising a pair of relatively spaced solenoids, a core having its ends disposed in said solenoids, direction indicating means connected to each end of the core, and electrical means for energizing the solenoids to move the direction indicating means into signaling position.

5. A direction indicator for motor vehicles comprising a casing, solenoids located within each end of said casing, a core slidable in said solenoids, direction indicating arms operatively connected to each end of the core, and electrical means for energizing the solenoids to move the direction indicating arms into signaling position.

In testimony whereof I affix my signature in presence of two witnesses.

LEVI M. BOWMAN.

Witnesses:
GLADYS JOHNSON,
L. W. MASON.

Copies of this patent may be obtained for five cents each, by addressing the "Commissioner of Patents, Washington, D. C."